United States Patent
Matos et al.

(10) Patent No.: US 12,487,811 B2
(45) Date of Patent: *Dec. 2, 2025

(54) NATURAL LANGUAGE PROCESSING ENGINE FOR COMPONENT LEVEL DATA MAPPING AND CODE REVISION IMPACT ANALYSIS

(71) Applicant: BANK OF AMERICA CORPORATION, Charlotte, NC (US)

(72) Inventors: Marcus Raphael Matos, Richardson, TX (US); Jack Lawson Bishop, III, Evanston, IL (US); Robert Cain Durbin, Jr., New Hope, PA (US); Daniel Joseph Serna, The Colony, TX (US); Benjamin Tweel, Romeoville, IL (US); Jake Michael Yara, Mint Hill, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 148 days.

This patent is subject to a terminal disclaimer.

(21) Appl. No.: 18/092,520

(22) Filed: Jan. 3, 2023

(65) Prior Publication Data
US 2024/0220229 A1 Jul. 4, 2024

(51) Int. Cl.
*G06F 9/44* (2018.01)
*G06F 8/65* (2018.01)
(Continued)

(52) U.S. Cl.
CPC ............ *G06F 8/65* (2013.01); *H04L 41/0686* (2013.01)

(58) Field of Classification Search
CPC .............................. G06F 8/65; H04L 41/0686
See application file for complete search history.

(56) References Cited

U.S. PATENT DOCUMENTS

| 6,804,691 | B2 | 10/2004 | Coha et al. |
| 7,650,331 | B1 | 1/2010 | Dean et al. |

(Continued)

FOREIGN PATENT DOCUMENTS

| DE | 102022120616 A1 * | 2/2023 | .......... G06F 11/0793 |
| WO | 2015148304 A1 | 10/2015 | |
| WO | 2015168203 A1 | 11/2015 | |

OTHER PUBLICATIONS

Jinfeng Lin, Traceability Transformed: Generating more Accurate Links with Pre-Trained BERT Models, 2021, pp. 1-12. https://ieeexplore.ieee.org/stamp/stamp.jsp?tp=&arnumber=9402118 (Year: 2021).*

(Continued)

*Primary Examiner* — Mongbao Nguyen
(74) *Attorney, Agent, or Firm* — Moore & Van Allen PLLC; Gabrielle M. Carlini

(57) ABSTRACT

Systems, computer program products, and methods are provided for code revision impact analysis. The method includes generating a system map based on data received from a plurality of network devices; receiving a data transmission including a text file; processing the text file via a natural language processing engine, where an output of the natural language processing engine comprises a plurality of expected updates; determining, based on the system map, at least one downstream effect of the plurality of expected updates; and performing a remedial action.

15 Claims, 6 Drawing Sheets

(51) Int. Cl.
  *G06F 9/445*   (2018.01)
  *G06F 9/455*   (2018.01)
  *H04L 41/0686* (2022.01)

(56) References Cited

U.S. PATENT DOCUMENTS

| | | | |
|---|---|---|---|
| 8,078,556 | B2 | 12/2011 | Adi et al. |
| 8,370,280 | B1 | 2/2013 | Lin et al. |
| 8,904,149 | B2 | 12/2014 | Eren et al. |
| 9,202,052 | B1 | 12/2015 | Fang et al. |
| 9,672,474 | B2 | 6/2017 | Dirac et al. |
| 9,813,435 | B2 | 11/2017 | Muddu et al. |
| 10,318,882 | B2 | 6/2019 | Brueckner et al. |
| 10,686,819 | B2 | 6/2020 | Mylavarapu et al. |
| 11,132,604 | B2 | 9/2021 | Chen et al. |
| 11,593,096 | B1 * | 2/2023 | Chaptini .................. G06F 8/77 |
| 11,595,269 | B1 * | 2/2023 | Ghosh .................... H04L 41/16 |
| 11,972,258 | B2 * | 4/2024 | Cabrera Lozoya ....... G06F 8/71 |
| 11,977,872 | B2 * | 5/2024 | Alamir ..................... G06F 8/65 |
| 2007/0061882 | A1 | 3/2007 | Mukhopadhyay et al. |
| 2010/0179930 | A1 | 7/2010 | Teller et al. |
| 2013/0346347 | A1 | 12/2013 | Patterson et al. |
| 2015/0379426 | A1 | 12/2015 | Steele et al. |
| 2016/0028599 | A1 | 1/2016 | Vasseur et al. |
| 2016/0078361 | A1 | 3/2016 | Brueckner et al. |
| 2019/0050750 | A1 | 2/2019 | Le et al. |
| 2022/0303295 | A1 * | 9/2022 | Erlingsson .......... G06F 16/9038 |
| 2022/0350588 | A1 * | 11/2022 | Liao ..................... G06N 20/00 |
| 2023/0094720 | A1 * | 3/2023 | Ramu ............... G06Q 10/06393 |
| | | | 705/7.42 |
| 2023/0110127 | A1 * | 4/2023 | Shetty .................... H04L 51/02 |
| | | | 704/9 |
| 2023/0214593 | A1 * | 7/2023 | Padukone ............... G06F 40/35 |
| | | | 704/2 |
| 2023/0273783 | A1 * | 8/2023 | Molander ................. G06F 8/61 |
| | | | 717/168 |
| 2023/0315421 | A1 * | 10/2023 | Picco .................. G06F 9/45558 |
| 2023/0342140 | A1 * | 10/2023 | King ....................... G06F 8/656 |
| 2023/0385054 | A1 * | 11/2023 | Wang ........................ G06F 8/65 |
| 2024/0111512 | A1 * | 4/2024 | Liu ....................... G06F 21/577 |
| 2024/0168747 | A1 * | 5/2024 | Klinemeier ............... G06F 8/65 |

OTHER PUBLICATIONS

English translation, Albright et al. (DE 102022120616 A1), 2023, pp. 1-61. (Year: 2023).*

* cited by examiner

NATURAL LANGUAGE PROCESSING ENGINE FOR COMPONENT LEVEL DATA MAPPING AND CODE REVISION IMPACT ANALYSIS

TECHNOLOGICAL FIELD

Example embodiments of the present disclosure relate to a natural language processing engine for automated detection of source code discrepancies.

BACKGROUND

In conventional systems, software update packages are typically accompanied by release notes that indicate the changes provided by the update. Oftentimes, however, release notes may be inaccurate or may fail to indicate a major change. As such, there is a need for a system which automatically ensures that there are no discrepancies between the source code of an update and the associated release notes.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for code revision impact analysis is presented. The system may include at least one non-transitory storage device and at least one processor coupled to the at least one non-transitory storage device, where the at least one processor is configured to: receive a data transmission including a text file; process the text file via a natural language processing engine, where an output of the natural language processing engine comprises a plurality of expected updates; determine, based on a system map, at least one downstream effect of the plurality of expected updates; and perform a remedial action.

In some embodiments, performing the remedial action includes transmitting an alert to a network device.

In some embodiments, performing the remedial action includes preventing a network device from installing a software update.

In some embodiments, the invention further includes generating the system map based on data received from a plurality of network devices.

In some embodiments the invention further includes determining that an impact score of the plurality of expected updates exceeds a predetermined threshold value.

In some embodiments, the invention further includes extracting the text file from an image file.

In some embodiments, the alert comprises a summary of the at least one downstream effect.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
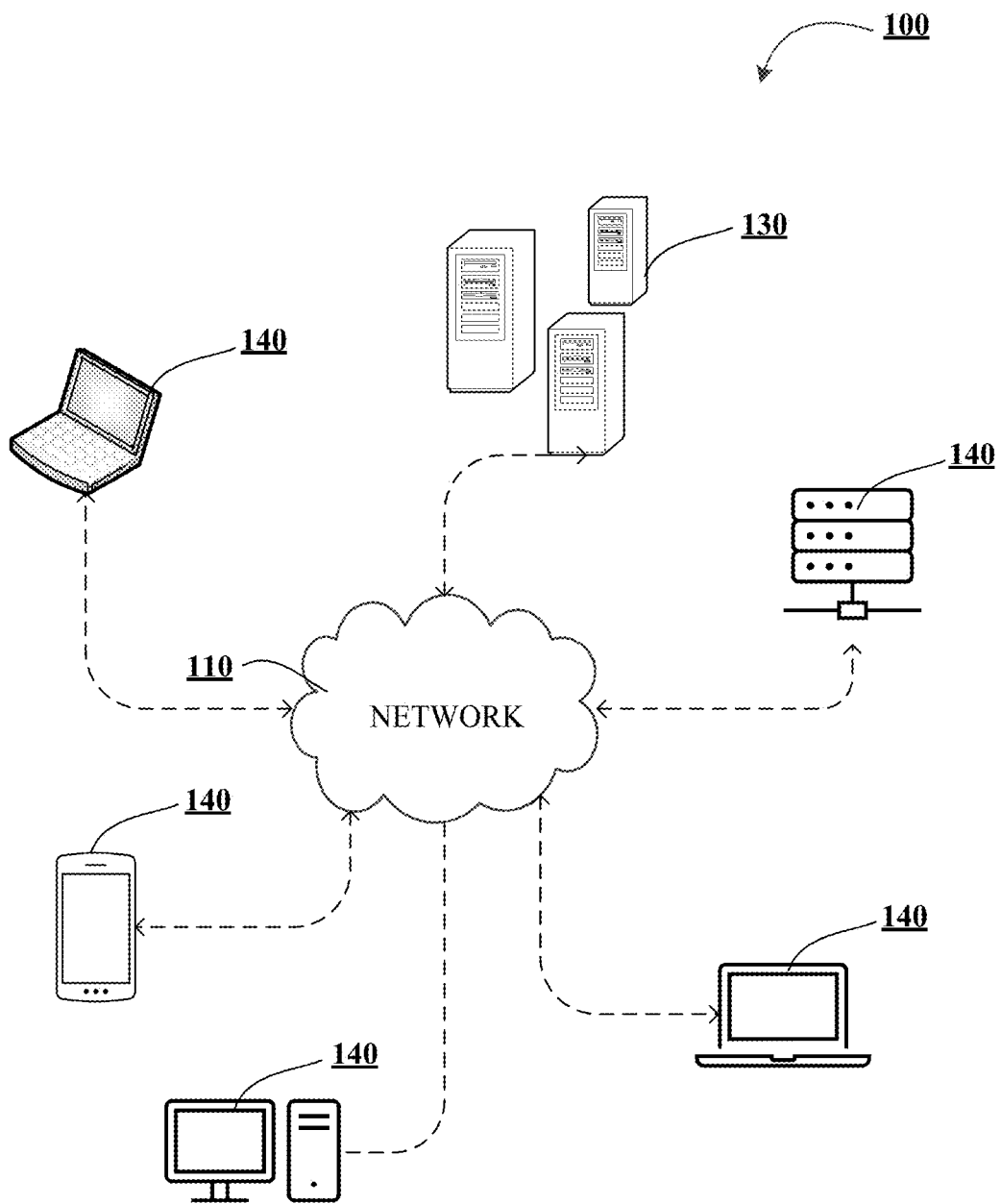
Figure 1B:
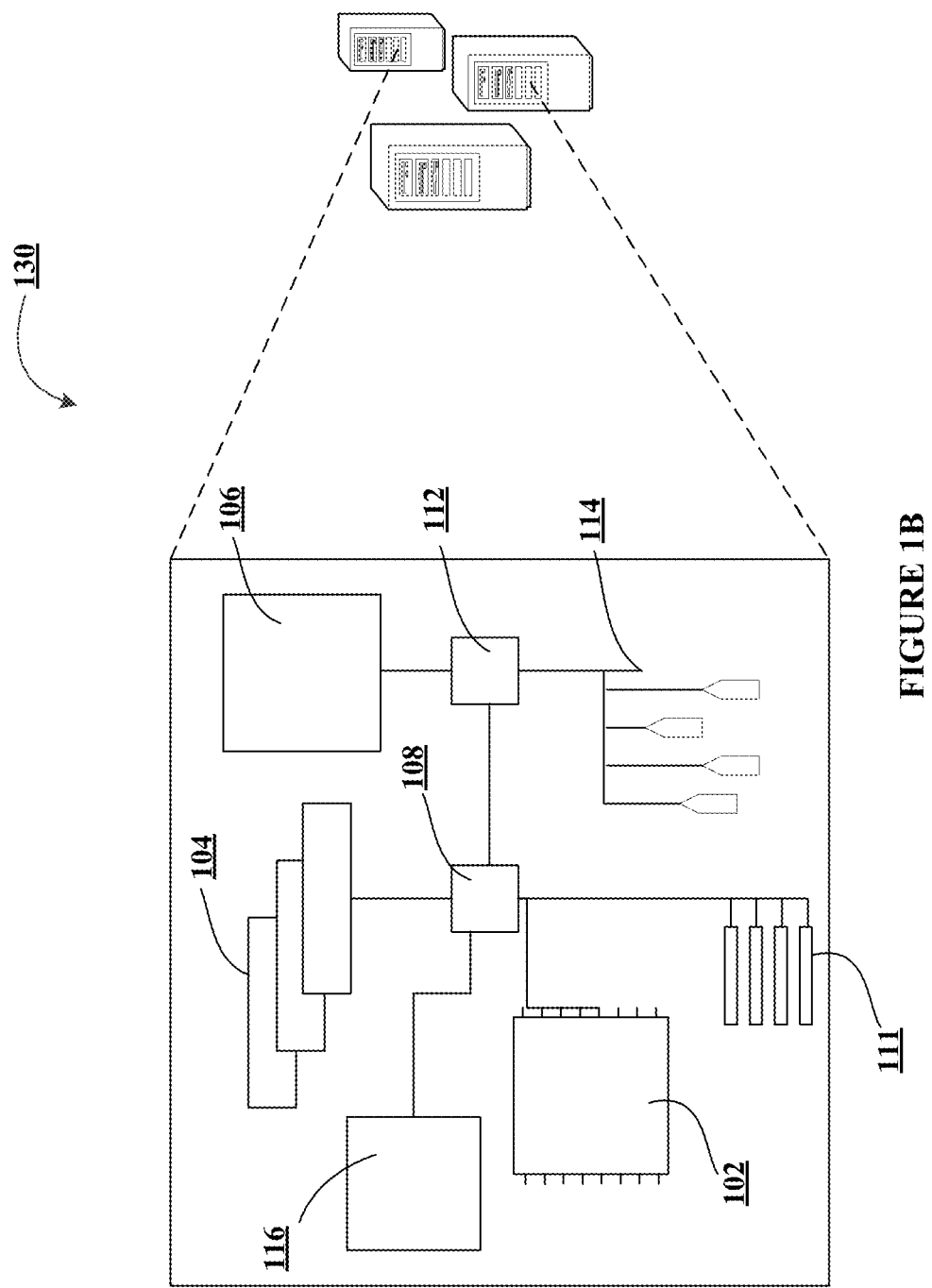
Figure 1C:
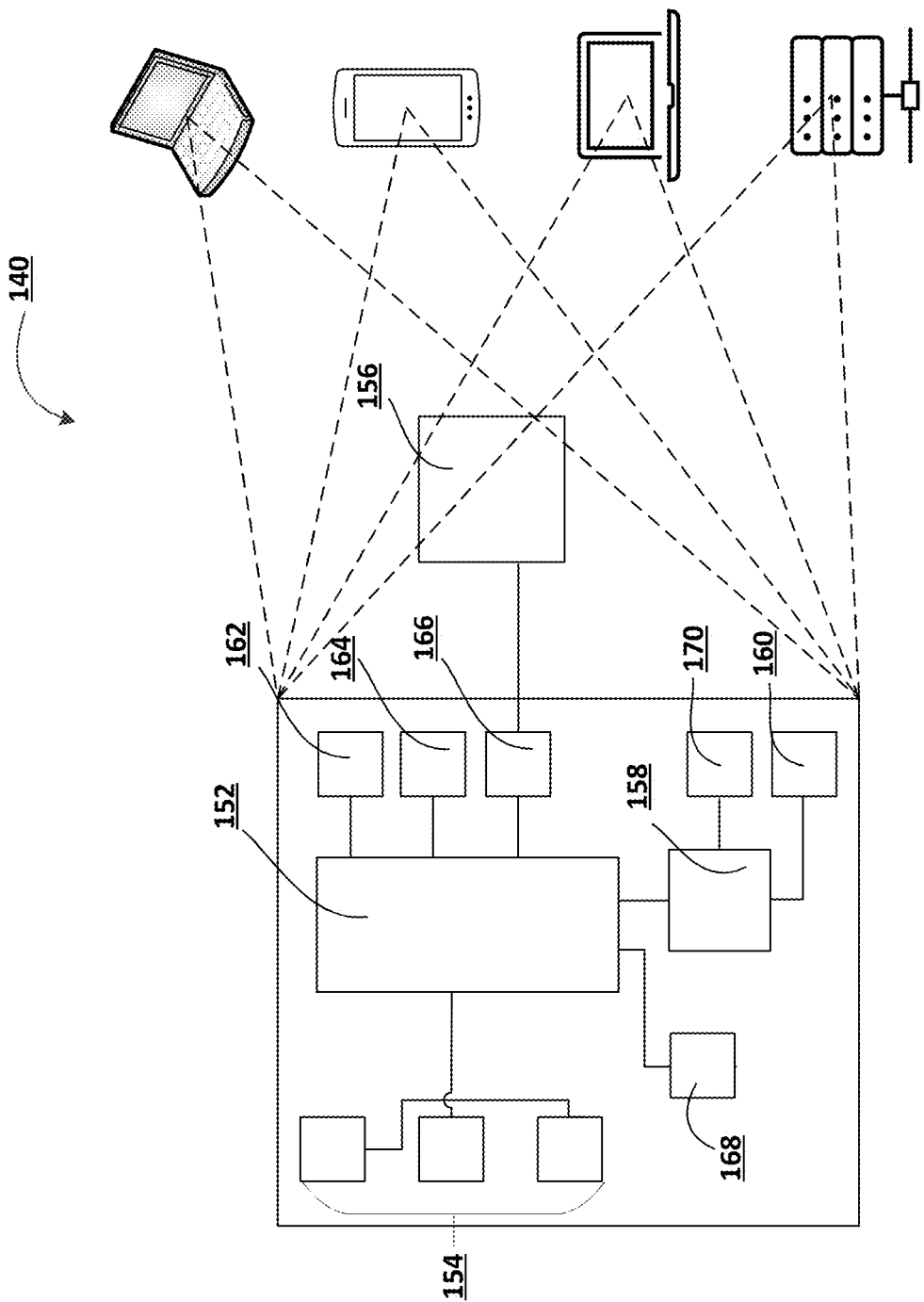
Figure 2:
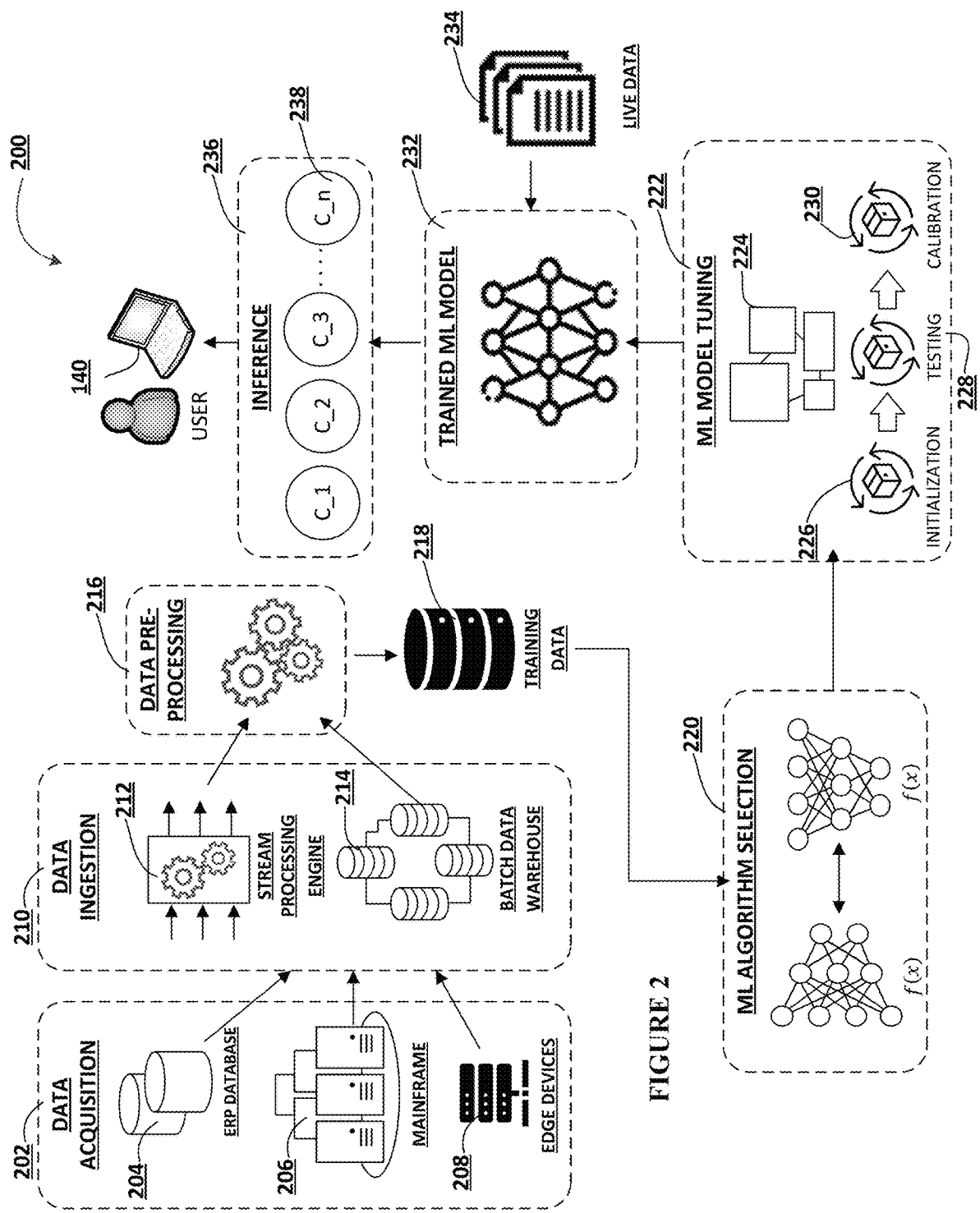
Figure 3:
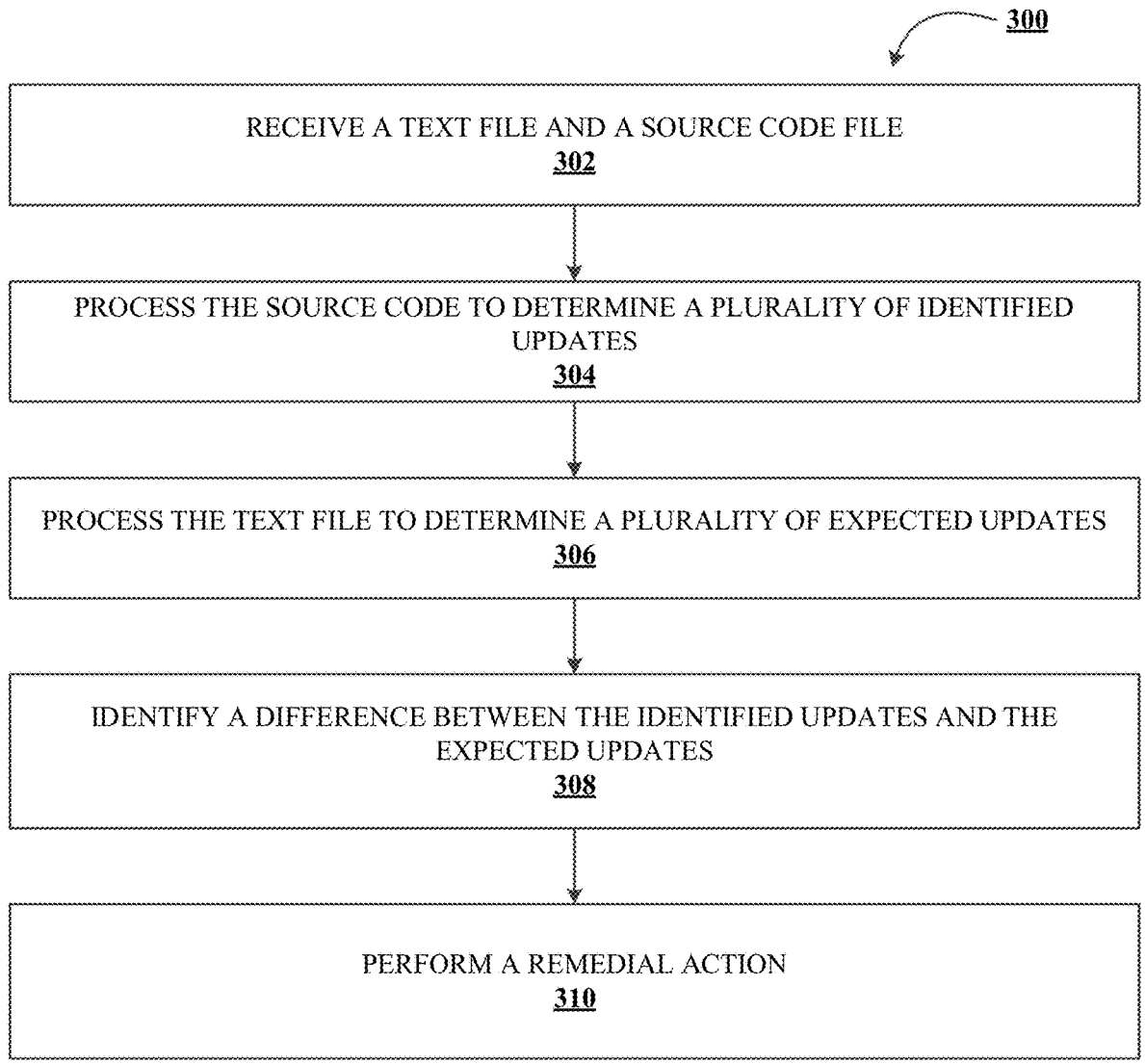
Figure 4:
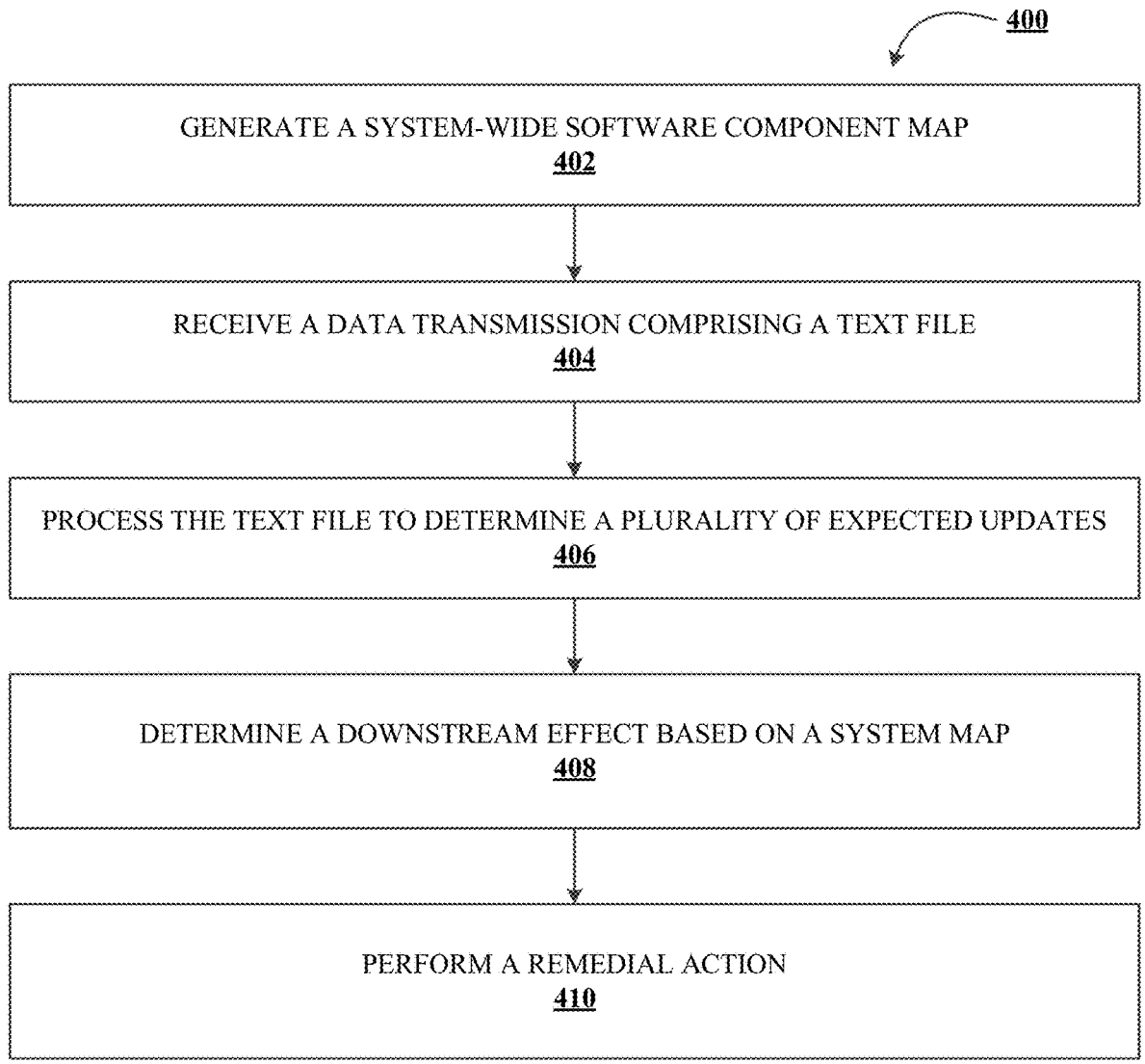

FIGS. 1A-1C illustrates technical components of an exemplary distributed computing environment for automated detection of source code discrepancies, in accordance with an embodiment of the disclosure;

FIG. 2 illustrates an exemplary machine learning (ML) subsystem architecture 200, in accordance with an embodiment of the invention;

FIG. 3 illustrates a process flow for automated detection of source code discrepancies, in accordance with an embodiment of the disclosure; and FIG. 4 illustrates a process flow for code revision impact analysis, in accordance with an embodiment of the invention.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In conventional computing systems, software update packages are typically accompanied by release notes that indicate the changes provided by the update. Oftentimes, however, release notes may be inaccurate or may fail to indicate a major change, or may fail to indicate potential downstream effects of the update, such as compatibility with other software applications. As such, a user is typically required to manually review the entire source code of the update package before determining whether to allow the update to proceed. The system provided herein solves this problem by utilizing a natural language processing engine to parse out expected software changes from a set of release notes. The system then processes the source code associated with the release notes to determine actual software changes contained within the update. The system then compares the expected changes and actual changes and alerts a system user if a discrepancy is identified. In some embodiments, the system provided herein solves this problem by utilizing a natural language processing engine to parse out expected software changes from a set of release notes. The system also generates a component-level data map of an entity-wide computing system. The system then analyzes the software changes against the data map to determine downstream effects of the update and alerts a system user if an issue is identified. This allows for faster package review times and increases the efficiency and security of software updates.

Accordingly, the present disclosure receives a data transmission including a text file and a source code file; processes the source code file via a machine learning engine, where an output of the machine learning engine includes a plurality of identified updates; processes the text file via a natural language processing engine, where an output of the natural language processing engine includes a plurality of expected updates; identifies a difference between the plurality of identified updates and the plurality of expected updates; and performs a remedial action. In some embodiments, the present disclosure receives a data transmission comprising a text file; processes the text file via a natural language processing engine, wherein an output of the natural language processing engine comprises a plurality of expected updates; determines, based on a system map, at least one downstream effect of the plurality of expected updates; and performs a remedial action.

What is more, the present disclosure provides a technical solution to a technical problem. As described herein, the technical problem involves the failure of release notes to accurately capture changes encoded within a software update, especially changes which may have downstream effects such as impacts on software compatibility. The technical solution presented herein automatically remediates these effects by 1) automatically detecting inaccuracies in the release notes and 2) automatically identifying downstream effects of the software update. In particular, the present disclosure reduces the amount of computing resources, such as processing resources, storage resources, network resources, and/or the like, that are being used, as well as reduces network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for the processes described herein, in accordance with an embodiment of the disclosure. As shown in FIG. 1A, the distributed computing environment 100 contemplated herein may include a system 130, an end-point or network device(s) 140, and a network 110 over which the system 130 and end-point or network device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include databases that host data related to software architecture (i.e. software component level interactions related to day-to-day business activities such as accounting, procurement, project management, exposure management, supply chain operations, and/or the like), a mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for automated detection of source code discrepancies, in accordance with an embodiment of the disclosure. The process may begin at block 302, wherein the system 130 receives a data transmission comprising a text file (e.g. release notes accompanying a software update) and a source code file (e.g. source code associated with the software update). In some embodiments, the system 130 may receive the data transmission from one or more end-point or network devices 140 associated with the computing environment. For example, some embodiments, the system 130 may receive the text file from a first network device, such as a user device, and may receive the source code file from a second network device, such as a remote server. In some embodiments, the system 130 may further receive an original source code file (i.e. current source code of a software application associated with the software update) as part of the data transmission. Furthermore, in some embodiments, the text file may be received as another file format such as an image file or the like. The system 130 may then convert the received file into a text file using a variety of conversion techniques, such as an optical character recognition technique or the like.

The process flow may then continue to block 304, where a machine learning engine analyzes the source code file. The structure and functions of the machine learning engine are discussed in greater detail with respect to FIG. 2. In some embodiments, the machine learning engine may also process the original source code file in order to generate more accurate insights about the source code file associated with the software update. Based on an output of the first machine learning engine, the system may determine a plurality of identified updates contained within the source code file. Identified updates may include any predictions or insights of the machine learning engine and may specifically identify a particular affected application and/or a category of application, an affected user and/or user category, and/or other related data such as a software compatibility data, network data, usage data, and/or the like. For example, the system may determine that the software update will prevent a software application from running on network devices using particular operating systems.

The process flow may then continue to block 306, where, in some embodiments, the system may instruct a natural language processing engine to analyze the text file. In some embodiments, the natural language processing engine is a second machine learning engine in accordance with FIG. 2. Based on an output of the second machine learning engine, the system may determine a plurality of expected updates indicated by the text file. Expected updates may include any predictions or insights of the natural language processing engine and may specifically identify a particular affected application and/or a category of application, an affected user and/or user category, and/or other related data such as a software compatibility data, network data, usage data, and/or the like. For example, the system may determine that the software update is expected to result in minor changes to a user interface.

The process flow may then continue to block 308, wherein the system may compare the plurality of expected updates determined in block 306 to the plurality of identified updates determined in block 304. In some embodiments, the system may use a set of predetermined rules to assign an impact score to both pluralities of updates. For example, the system may assign a lower score to updates associated with a front-end or user interface of a software application, and/or may assign a higher score to updates associated with a back-end of a software application, such as updates affecting compatibility with other applications or devices. In some embodiments, the system may then determine that the impact score of the plurality of identified updates exceeds the impact score of the expected updates. Continuing with the previous examples, the identified update that prevents a software application from running on a particular operating system may have a high impact score, while the expected update associated with a user interface may have a low impact. The system may then determine that the identified updates found within the source will have a greater impact than the expected impact provided by the text file.

The process flow may then continue to block 310, wherein the system may perform a remedial action based on the determination made in block 308. In some embodiments, the system may transmit instructions to a network device to perform the remedial action. Additionally or alternatively, the system may be configured to directly perform the action. The action may comprise any steps relating to the source code file and text file, such as preventing the software update, transmitting an alert, transmitting a summary of the plurality of identified updates, updating a user interface, and/or updating user authentication credentials.

FIG. 4 illustrates a process flow 400 for code revision impact analysis, in accordance with an embodiment of the disclosure. The process may begin at block 402, wherein the system 130 generates a system map. In some embodiments, the system map may be a graphical map of the distributed computing environment and may comprise a plurality of nodes (i.e. applications, devices, databases, users, software components, and/or the like) and a plurality of edges, or relationships between nodes (i.e. communication channels, permissions, data inputs and/or outputs, network traffic, and/or the like). In some embodiments, the system map may be updated in real time as software updates occur. Additionally or alternatively, the system map may be regularly updated based on receiving data from a plurality of network devices in the distributed computing environment.

The process flow may then continue to block 404, wherein the system 130 receives a data transmission comprising a text file associated with a pending software update (e.g. release notes). In some embodiments, the system 130 may receive the data transmission from one or more end-point or network devices 140 associated with the computing environment. For example, some embodiments, the system 130 may receive the text file from a first network device, such as a user device, and may receive the source code file from a second network device, such as a remote server. In some embodiments, the text file may be received as another file format such as an image file or the like. The system 130 may then convert the received file into a text file using a variety of conversion techniques, such as an optical character recognition technique or the like.

The process flow may then continue to block 406, where, in some embodiments, the system may instruct a natural language processing engine to analyze the text file. In some embodiments, the natural language processing engine is a machine learning engine in accordance with FIG. 2. Based on an output of the machine learning engine, the system may determine a plurality of expected updates indicated by the text file. Expected updates may include any predictions or insights of the natural language processing engine and may specifically identify a particular affected application and/or a category of application, an affected user and/or user category, and/or other related data such as a software compatibility data, network data, usage data, and/or the like. For example, the system may determine that the software update is expected to affect a security protocol of a particular software application.

The process flow may then continue to block 408, wherein the system may determine, based on the system map, at least one downstream effect of the plurality of expected updates determined in block 406. In some embodiments, the system may use a set of predetermined rules to assign an impact score to the at least one downstream effect. For example, the system may assign a low score based on determining that an expected update only affects one node in the system map, and/or may assign a high score based on determining that an expected update affects a plurality of nodes (e.g. by affectively the compatibility between two software applications). In some embodiments, the system may then determine that the impact score of the plurality of identified updates exceeds a predetermined threshold value. For example, an identified update that affects a security protocol of multiple network devices may have a high enough impact score to exceed the predetermined threshold value, and/or may exceed the threshold value when aggregated with the impact scores of other expected updates.

The process flow may then continue to block 410, wherein the system may perform a remedial action based on the determination made in block 408. In some embodiments, the system may transmit instructions to a network device to perform the remedial action. Additionally or alternatively, the system may be configured to directly perform the action. The action may comprise any steps relating to the text file and its associated software update, such as preventing the software update, transmitting an alert, transmitting a summary of the at least one downstream effect, updating a user interface, and/or updating user authentication credentials.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for code revision impact analysis, the system comprising:
at least one non-transitory storage device; and
at least one processor coupled to the at least one non-transitory storage device, wherein the at least one processor is configured to:
train a natural language processing engine to output a plurality of expected updates associated with a text file, wherein training the natural language processing engine comprises:
receiving, via a data acquisition engine, a training dataset comprising software code;
converting, via a data pre-processing engine, the training dataset from a non-standardized format to a standardized format;
processing, via the data pre-processing engine, the converted training dataset to generate an extracted feature set using a dimensionality reduction technique;
executing, using a machine learning model tuning engine, a plurality of testing cycles using the extracted feature set, wherein the machine learning model tuning engine is configured to vary one or more testing parameters for each testing cycle of the plurality of testing cycles; and
deploying the trained natural language processing engine into a production environment;
generate a system map of a distributed computing environment, wherein the system map comprises a plurality of nodes;
receive a data transmission comprising an image file associated with a software update;
convert the image file into a text file via an optical character recognition (OCR) process;
process the converted text file via the trained natural language processing engine, wherein an output of the trained natural language processing engine comprises the plurality of expected updates;
determine, based on the generated system map, at least one downstream effect of the plurality of expected updates, wherein the at least one downstream effect is associated with one or more nodes of the plurality of nodes;
calculate an impact score for the at least one downstream effect, wherein the impact score is based on the one or more nodes; and
perform a remedial action based on the impact score, wherein performing the remedial action comprises preventing a network device from installing the software update.

2. The system of claim 1, wherein performing the remedial action comprises transmitting an alert to the network device.

3. The system of claim 1, wherein the at least one processor is further configured to generate the system map based on data received from a plurality of network devices.

4. The system of claim 1, wherein the at least one processor is further configured to determine that the impact score exceeds a predetermined threshold value.

5. The system of claim 2, wherein the alert comprises a summary of the at least one downstream effect.

6. A computer program product for code revision impact analysis, the computer program product comprising a non-transitory computer-readable medium comprising code causing an apparatus to:
train a natural language processing engine to output a plurality of expected updates associated with a text file, wherein training the natural language processing engine comprises:

receiving, via a data acquisition engine, a training dataset comprising software code;

converting, via a data pre-processing engine, the training dataset from a non-standardized format to a standardized format;

processing, via the data pre-processing engine, the converted training dataset to generate an extracted feature set using a dimensionality reduction technique;

executing, using a machine learning model tuning engine, a plurality of testing cycles using the extracted feature set, wherein the machine learning model tuning engine is configured to vary one or more testing parameters for each testing cycle of the plurality of testing cycles; and deploying the trained natural language processing engine into a production environment;

generate a system map of a distributed computing environment, wherein the system map comprises a plurality of nodes;

receive a data transmission comprising an image file associated with a software update;

convert the image file into a text file via an optical character recognition (OCR) process;

process the converted text file via the trained natural language processing engine, wherein an output of the trained natural language processing engine comprises the plurality of expected updates;

determine, based on the generated system map, at least one downstream effect of the plurality of expected updates, wherein the at least one downstream effect is associated with one or more nodes of the plurality of nodes;

calculate an impact score for the at least one downstream effect, wherein the impact score is based on the one or more nodes; and perform a remedial action based on the impact score, wherein performing the remedial action comprises preventing a network device from installing the software update.

7. The computer program product of claim 6, wherein performing the remedial action comprises transmitting an alert to the network device.

8. The computer program product of claim 6, wherein the apparatus is further configured to generate the system map based on data received from a plurality of network devices.

9. The computer program product of claim 6, wherein the apparatus is further configured to determine that the impact score exceeds a predetermined threshold value.

10. The computer program product of claim 7, wherein the alert comprises a summary of the at least one downstream effect.

11. A method for code revision impact analysis, the method comprising:

training a natural language processing engine to output a plurality of expected updates associated with a text file, wherein training the natural language processing engine comprises:

receiving, via a data acquisition engine, a training dataset comprising software code;

converting, via a data pre-processing engine, the training dataset from a non-standardized format to a standardized format;

processing, via the data pre-processing engine, the converted training dataset to generate an extracted feature set using a dimensionality reduction technique;

executing, using a machine learning model tuning engine, a plurality of testing cycles using the extracted feature set, wherein the machine learning model tuning engine is configured to vary one or more testing parameters for each testing cycle of the plurality of testing cycles; and deploying the trained natural language processing engine into a production environment;

generating a system map of a distributed computing environment, wherein the system map comprises a plurality of nodes;

receiving a data transmission comprising an image file associated with a software update;

converting the image file into a text file via an optical character recognition (OCR) process;

processing the converted text file via the trained natural language processing engine, wherein an output of the trained natural language processing engine comprises the plurality of expected updates;

determining, based on the generated system map, at least one downstream effect of the plurality of expected updates, wherein the at least one downstream effect is associated with one or more nodes of the plurality of nodes;

calculating an impact score for the at least one downstream effect, wherein the impact score is based on the one or more nodes; and performing a remedial action based on the impact score, wherein performing the remedial action comprises preventing a network device from installing the software update.

12. The method of claim 11, wherein performing the remedial action further comprises transmitting an alert to the network device.

13. The method of claim 11, wherein the method further comprises generating the system map based on data received from a plurality of network devices.

14. The method of claim 11, wherein the method further comprises determining that the impact score exceeds a predetermined threshold value.

15. The method of claim 12, the alert comprises a summary of the at least one downstream effect.

* * * * *